No. 798,923. PATENTED SEPT. 5, 1905.
E. W. ROLLINS.
TIME AND DISTANCE RECORDING MECHANISM FOR VEHICLES.
APPLICATION FILED JULY 28, 1904.
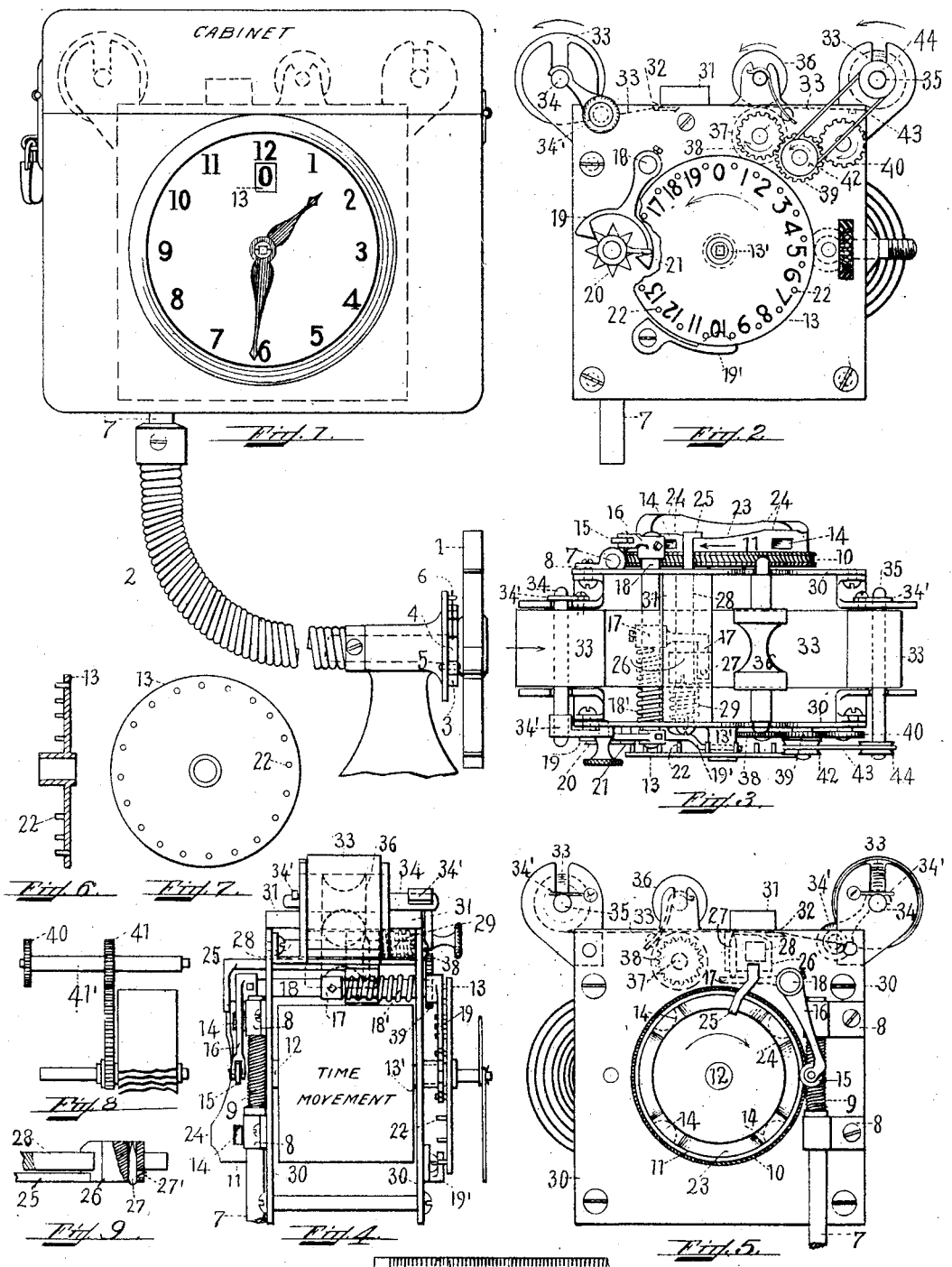

UNITED STATES PATENT OFFICE.

EUGENE W. ROLLINS, OF ROSLINDALE, MASSACHUSETTS.

TIME AND DISTANCE RECORDING MECHANISM FOR VEHICLES.

No. 798,923. Specification of Letters Patent. Patented Sept. 5, 1905.

Application filed July 28, 1904. Serial No. 218,467.

*To all whom it may concern:*

Be it known that I, EUGENE W. ROLLINS, a citizen of the United States of America, and a resident of Roslindale, in the county of Suffolk and Commonwealth of Massachusetts, have invented certain new and useful Improvements in Time and Distance Recording Mechanism for Vehicles, of which the following is a specification.

My invention relates to improved mechanism for measuring distance, registering the same, and indicating elapsed time, preferably applied to automobiles.

The objects of my invention are, first, to provide an instrument to indelibly record the distance in miles and their fractional parts accomplished by any mechanically-actuated road-vehicle; second, to register additionally the absolute period consumed in achieving such distance; third, the combination of mechanism indicating the progress of true time, and in other essentials hereinafter described and specifically claimed. I attain these objects by the mechanism illustrated in the accompanying drawings, forming a part of this specification, in which—

Figure 1 denotes a front elevation of the mechanism inclosed in a cabinet having a visible time-dial with an aperture through which the distance-indicating dial can be read as organized for use with the depending flexible shaft transmitting motion from the forward axle of the moving vehicle. Fig. 2 is a front elevation of the mechanism removed from its cabinet, the clock-hands off, but otherwise assembled, and the recording-paper and actuating devices in position. Fig. 3 indicates a plan of the same. Fig. 4 is a side elevation of Fig. 2 viewed from the left. Fig. 5 exhibits a rear elevation in the vertical position shown in Fig. 2. Figs. 6 and 7 are views in transverse section and rear elevation, respectively, of the register-wheel. Fig. 8 is a side elevation of the shaft and gear added to the clock mechanism to transmit motion to the groups of gears that control the movement of the recording-paper. Fig. 9 exhibits the stylus-block and stylus. Fig. 10 illustrates a fragment of the recording-paper, showing its permanent graduations of time and the punctures produced by the stylus.

Corresponding numerals denote similar features throughout the drawings, referring to which—

1 indicates the star-wheel attached to and imparting intermittent rotation to the flexible shaft 2 as the points of said wheel successively receive contact at short intervals from a striker attached to the hub or spoke of the carriage-wheel, as in the usual manner of these appliances and unnecessary to illustrate. To obtain retrograde as well as progressive motion of said star-wheel 1, the fluted ratchet 3 is secured to the hub thereof, as in Fig. 1, and the pawl 4, round-headed to facilitate liberation from its ratchet, is pivoted to the bracket 5 or in any stationary manner convenient is held temporarily in contact with said ratchet 3 by the retaining-spring 6. Said bracket 5 may be supported from the frame of the vehicle and serves as a journal for the rotatable shaft 2, the opposite end of which is secured to the shaft 7, Fig. 5, upheld in bearings 8 on the clock-frame and provided with a worm 9, which rotates the worm-gear 10, and its integral cam-wheel 11, mounted upon its stub-shaft 12. Said wheel 11 is provided with four recesses or pockets 14 within its perimeter, the space intervening each denoting in the present instance one-fourth of a mile. This capacity of measurement, however, may be increased in ratio to eighths, sixteenths, &c., by a corresponding increase of said recesses. A roll 15 enters each recess at every quarter-revolution of the wheel 11, and thus actuates the rock-lever 16 and the hammer 17, each keyed to the rock-shaft 18, which is held by torsional force of the anchored spring 18', Fig. 3, enveloping it so as to secure constant pressure of the roll 15 against the perimeter of the wheel 11 to properly actuate said hammer to drive the stylus and puncture the paper, as hereinafter more fully described. The end of the shaft 18 remote from said rock-lever also carries the anchor and pellets 19, Fig. 2, which operate the escape-wheel 20. Collectively these devices are commonly known as a "recoil escapement." A pin 21, radially projecting from the hub of said wheel 20 and in the plane of its rotation, at each revolution thereof imparts motion intermittently to each of the series of striking-pins 22, projecting from and at right angles with the rear face of the register-disk 13, the hub of which is journaled loosely over the hour-hand-wheel sleeve 13', Figs. 2 and 4, in alinement with the stub-shaft 12 and at the rear of the casing. Its rotation counter clockwise brings the encircling numerals written upon its face in consecutive order from left to right under the opening in the casing, Fig. 1, where they may be read, as at O. Any backlash of said disk 13 is obviated by the spring-detent 19', Fig. 2, secured to the frame adjacent to the lower edge of the disk as it intermittently contacts with the striking-pins 22. The wheel 11 is further provided circumferentially on its face with a cam 23, Fig. 5, its four ascending planes terminating each in a short rest or poise 24 immediately outside each of the perimetric recesses 14 in a manner that one revolution of the cam 23 encompasses in its path a distance from its face equal to the breadth of the recording-ribbon. For example, the lowest poise 24 brings the recording devices at the ribbon's edge 33', producing the initial puncture. During the interval of ascending the adjacent plane said recording devices are gradually drawn by the cam nearer the center of the ribbon and in position when the second poise is met to produce the second puncture. The consecutive movements are fully set forth in the hereinafter description of the operation. Said cam imparts variable motion to the sliding member 25, carrying the stylus-block or traveler 26, slidingly supported on the fixed square rod 28, Fig. 9, said block being confined in its action relative to the cam 23 by the restraining-spring 29, one end of which is anchored on the case 30, Fig. 3, and its opposite end to said block 26, which movably embraces the vertical stylus 27. This is actuated upward by the hammer 17 to puncture the paper 33 each time the roll 15 enters the recesses 14. The poise 24 simultaneously reaching the member 25, allows a momentary rest to the block 26, permitting the stylus to perform its office. As the undulating surface of the cam revolves, the member 25 is moved horizontally, carrying the block 26, spring 29, and retracted stylus 27 transversely the paper 33 to a new position, the poise reaching the member 25, as in the former instance, when, the stylus 27 being actuated, the paper is again punctured. Thus the operation is repeated indefinitely until the progression is arrested. Superimposed above said rod 28 and alined with it is secured the guide-plate 31, having an aperture 32, Fig. 2, adjacent to the upper face of said block 26, through which the paper ribbon 33 is carried as it is unwound from the holder 34 confined in its bracket by the several devices 34' and rewound upon the receiver 35, passing meanwhile between the pressure-roll 36 and driving-roll 37, having a gear 38, by which it is rotated through the intermediate gear 39, the latter receiving motion from the gear 40, actuated by the corresponding inside gear 41, Fig. 8, each fixed upon the same shaft 41', the latter gear being driven by the clock-train. A belt-wheel 42, integral with said gear 39, transmits its motion through the belt 43 to the wheel 44 on the receiver 35, thus rewinding the paper 33 after receiving its record of distance in punctures by the stylus 27, actuated by the hammer 17 and its coacting members previously described, as illustrated in Fig. 10.

The practical operation of my improved mechanism is as follows: Assuming the instrument to be attached to the carriage-dasher in a readable position and connection temporarily established with the vehicle-wheel, the revolutions of the latter rotates the star-wheel 1 with its shaft 2 and, through the worm 9, the gear and wheel 11. As the latter revolves the roll 15 falls into one of the recesses 14, throwing up the hammer 17, which forces the stylus 27 upward and punctures the paper 33 near its edge 33'. Simultaneously the member 25, actuated by the cam 23, rests upon the dwell 24 at the instant of puncture. As the cam rotates said roll 15 is ejected from its recess, allowing the stylus to fall accelerated by its spring 27', Fig. 9, to its non-puncturable position. The member 25 meanwhile ascending to the next dwell draws the block 26 transversely the paper, which receives a second puncture nearer the center thereof when the cam-dwell 24 is under said member, and the roll 15 again falls into the succeeding recess 14, as in the former instance. The alternate movement of said block and coacting parts produces the record of distance by four punctures transversely and obliquely, as shown in Fig. 10, and at regular intervals throughout its length, each puncture representing one-fourth of a mile. It will be understood that the progression of the vehicle is indicated by the rotation of the numerals inscribed upon the register-disk 13 as they successively appear before the aperture in the clock-dial, while, as obviously, the elapsed time consumed in such progression may be simultaneously observed. Should, however, such observation be omitted or the memorizing of the numerals be in error, the registered paper 33 when removed from the cabinet discloses the unerrable record by which the distance traversed is easily computed.

Having thus ascertained the construction and operation of my improved mechanism, I do not restrict myself to the specific embodiments herein given for the purpose of illustration, as the same may be modified while adhering to the true spirit of my invention.

I claim—

1. In an instrument of the character described, a mechanism for indicating the travel of a moving vehicle, recording such movement, and indicating elapsed time thereof embracing a clock-train, a wheel having perimetric recesses, a worm-gear therewith provided, means actuated by the moving vehicle to rotate said gear, a rock-shaft, a roll actuated by said rock-shaft and coacting with said recesses, and a recording device 27, in combination therewith a registering-disk bearing certain face numerals circumferentially and provided with a like series of striking-pins alternately opposite said numerals, and means to impart counter clockwise rotation to said disk intermittently from said rock-shaft.

2. In a mechanism of the character described a wheel 11, a worm-gear thereon provided, a worm-shaft coacting with said gear, a series of recesses within the perimeter of said wheel, and a roll torsionally forced into said recesses intermittently, in combination a rock-shaft, a rock-lever supporting the roll and secured to one end of said shaft, a wheel supporting radially a pin, means attached to the opposite end of the rock-shaft to impart intermittent rotation to said wheel, and a register-disk adapted to rotate always in a reverse direction to the rotation of the clock-hands.

3. In a road-vehicle the combination of a wheel thereof, a shaft having a worm, means to intermittently transmit the revolutions of said wheel to said shaft, a cam-wheel having a worm-gear coacting with the worm-shaft and provided with a series of perimetric recesses, a rock-shaft having a lever provided with a roll adapted by torsional force to enter said recesses, and a hammer actuated by the motion of the lever to operate means whereby the paper ribbon is punctured to produce a record of vehicular progress.

4. A wheel having perimetric recesses and provided with a cam circumferentially on its face, a roll adapted to enter said recesses at every quarter-revolution of said wheel, a sliding member actuated by said cam provided with a traveler movably supported, and means to restrain its action relative to the cam, a stylus within said traveler and means to actuate the stylus to puncture the paper to produce the record of distance traversed, a rock-shaft, a rock-lever supported thereby adjacent to and actuated by said recesses, a register-disk and means connected to the shaft end remote from said rock-lever to impart a counter rotation of the register-disk from the rotation of the cam.

5. In a time and distance recording mechanism for vehicles, a register-disk having a series of numerals upon its face and adapted to be mounted loosely, a sleeve over the hour-hand wheel arranged to support said disk, and a series of striking-pins circumferentially arranged upon its rear, in combination a rock-shaft having a lever and a hammer, a roll adapted in conjunction with a series of perimetric recesses to actuate said lever and hammer, and means coacting with the hammer to record progression.

6. A cabinet exposing a time-graduated dial, a clock-train therein provided with means to impart motion to a ribbon-supporting mechanism, a traveler provided with a stylus to puncture the moving ribbon at certain intervals, a restraining-spring controlling the traveler, a sliding member actuating said traveler, means to impart horizontal motion to said sliding member and means to actuate upward said stylus, in combination therewith a register-disk, a rock-shaft and means therewith connected to actuate said disk, a rock-lever attached to said shaft, a wheel actuating said lever, and a recording device arranged and adapted to indicate the progress in miles or their fractions and the time consumed in said progress.

7. In an instrument of the class defined the following instrumentalities, a cabinet, a casing inclosed therein, a clock-train supported thereby and provided with means to actuate the recording-paper, a wheel having a face-cam and perimetric recesses, a worm-shaft actuating said wheel and means secured to said shaft to transmit the motion of the vehicle in a manner to record progressive or retrograde travel, a rock-lever coacting with the perimetric recesses, a rock-shaft having a hammer actuated by said lever, a stylus operated by said hammer, a spring-restraining traveler supporting said stylus and means coacting with the cam to carry the traveler at certain intervals transversely the recording-ribbon, a register-disk loosely mounted, a sleeve over the hour-hand wheel supporting said disk and forming an integral part thereof, a wheel provided with a pin, and means connected to the rock-shaft to actuate intermittently said wheel to rotate the registered disk to designate the number of miles or their fractions of vehicular travel substantially as specified.

Signed at Boston, Massachusetts, this 19th day of July, 1904.

EUGENE W. ROLLINS.

Witnesses:
   GEO. E. MORRILL,
   FRED M. ROLLINS.